US011900730B2

(12) United States Patent
Lesso et al.

(10) Patent No.: US 11,900,730 B2
(45) Date of Patent: Feb. 13, 2024

(54) BIOMETRIC IDENTIFICATION (71) Applicant: Cirrus Logic International Semiconductor Ltd., Edinburgh (GB)

(72) Inventors: John P. Lesso, Edinburgh (GB); Jason P. Rhode, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 717 days.

(21) Appl. No.: 17/066,137

(22) Filed: Oct. 8, 2020

(65) Prior Publication Data
US 2021/0192244 A1 Jun. 24, 2021

Related U.S. Application Data

(60) Provisional application No. 62/949,619, filed on Dec. 18, 2019.

(51) Int. Cl.
*G06V 40/50* (2022.01)
*G06F 17/18* (2006.01)
(Continued)

(52) U.S. Cl.
CPC .............. *G06V 40/50* (2022.01); *G06F 17/18* (2013.01); *G10L 15/02* (2013.01); *H04R 1/1016* (2013.01);
(Continued)

(58) Field of Classification Search
CPC .... G06V 40/50; G06V 20/64; G06V 10/7715; G06V 40/10; G06V 40/16; G06V 10/75; G06F 17/18; G06F 21/32; G06F 18/2135; G06F 16/54; G06F 3/011; G06F 3/012; G06F 3/013; G06F 3/017; G06F 3/0304; G10L 15/02; G10L 2015/025; H04R 1/1016; H04R 1/1075; H04R 2460/13; H04R 3/005; G06T 3/0068; G06T 7/60;
(Continued)

(56) References Cited

U.S. PATENT DOCUMENTS 10,896,682 B1\* 1/2021 Dusan ..................... G10L 15/00
2013/0343558 A1\* 12/2013 Fox ..................... G10L 21/0208
381/71.14
(Continued)

FOREIGN PATENT DOCUMENTS

WO 2019008387 A1 1/2019

OTHER PUBLICATIONS

Partial International Search Report and Provisional Opinion of the International Searching Authority, International Application No. PCT/GB2020/052516, dated Dec. 16, 2020.
(Continued)

*Primary Examiner* — Nimesh Patel
(74) *Attorney, Agent, or Firm* — Jackson Walker L.L.P (57) ABSTRACT

A method of biometric identification of a person comprises, during an enrolment phase determining at least one enrolment transfer function for bone conduction of an audio signal through an enrolling user's head. The enrolment transfer function is stored. During a verification phase, at least one verification transfer function for bone conduction of an audio signal through the person's head is determined. It is then determined from the at least one verification transfer function and the at least one enrolment transfer function whether the person is the enrolling user.

11 Claims, 9 Drawing Sheets

(51) Int. Cl.
*G10L 15/02* (2006.01)
*H04R 1/10* (2006.01)

(52) U.S. Cl.
CPC ...... *H04R 1/1075* (2013.01); *G10L 2015/025* (2013.01); *H04R 2460/13* (2013.01)

(58) Field of Classification Search
CPC ..................... G06T 17/00; G06T 19/20; G06T 2207/10012; G06T 2207/10016; G06T 2207/10028; G06T 2219/2004; G06T 2219/2016; G06T 2219/2021; G06T 9/00; G06T 9/001; G06T 5/006; G06T 2200/08; G06T 2207/10024; G06T 2219/2012; G06T 19/006; G06T 2207/30168; G06T 5/001; G06T 15/205; G06T 7/00; G06T 7/12; G06T 7/50; G06T 7/593; G06T 19/00; G06T 2207/20084; G06T 2207/20212; G06T 2207/20221; G06T 5/00; G06T 5/002; G06T 7/246; H04S 7/303; H04S 1/005; H04S 2420/01; G06K 9/6247; G06K 9/00201; G06K 9/00362; G06K 9/00214; G06K 9/00355; G06K 9/6202; G06K 9/00302; G06K 9/00315; G06K 2009/00644; G06K 9/00637; G06K 9/00664; G06K 9/4652; B64C 2201/122; B64C 2201/123; B64C 2201/127

See application file for complete search history.

(56) References Cited

U.S. PATENT DOCUMENTS

| | | | |
|---|---|---|---|
| 2014/0188467 A1* | 7/2014 | Jing | H04R 3/005 |
| | | | 704/233 |
| 2015/0245129 A1 | 8/2015 | Dusan et al. | |
| 2017/0116995 A1* | 4/2017 | Ady | H04W 12/06 |
| 2017/0347180 A1* | 11/2017 | Petrank | G06F 3/165 |
| 2019/0012447 A1* | 1/2019 | Lesso | G10K 11/17823 |
| 2020/0184057 A1* | 6/2020 | Mukund | H04R 3/005 |

OTHER PUBLICATIONS

International Search Report and Written Opinion of the International Searching Authority, International Application No. PCT/GB2020/052516, dated Mar. 22, 2021.

* cited by examiner

ON-HEAD

OFF-HEAD

BIOMETRIC IDENTIFICATION

The present disclosure claims priority to U.S. Provisional Patent Application Ser. No. 62/949,619, filed Dec. 18, 2019, which is incorporated by reference herein in its entirety.

TECHNICAL FIELD

This relates to a biometric identification system, and in particular to a system that can be used without requiring specific actions to be taken by the user.

BACKGROUND

Biometric identification systems are becoming common. For example, the control of electronic devices such as smartphones often uses biometric identification systems such as facial recognition and fingerprint recognition. In addition, devices such as smartphones often include voice assistants, whereby spoken commands are interpreted by a speech recognition system. Depending on the type of command that is received, the system may use speaker recognition (i.e. identifying the person speaking, rather than the content of the speech) before acting on a received spoken command. For example, where a command relates to a financial transaction of some sort, or relates to the transfer of personal data, the system may perform speaker recognition, using a voice biometric, in order to verify the identity of the person speaking before acting on the command.

One disadvantage of many biometric systems is that they require specific actions to be taken by a user, such as looking into a camera in a specific way in the case of facial recognition, and placing their finger in a specific location in the case of fingerprint recognition.

It is also true that no biometric system is perfect, and hence that the reliability of a biometric authentication system can be improved if it uses two forms of independent biometric authentication.

Bone conduction headphones are known, in which sound is generated through speaker pads that rest on the user's skull or jaw, so that the sound is transmitted through the user's bones to their ear.

SUMMARY

According to a first aspect of the present invention, there is provided a method of biometric identification of a person comprising, during an enrolment phase:
determining at least one enrolment transfer function for bone conduction of an audio signal through an enrolling user's head; and
storing the or each transfer function, and
during a verification phase:
determining at least one verification transfer function for bone conduction of an audio signal through the person's head; and
determining from the at least one verification transfer function and the at least one enrolment transfer function whether the person is the enrolling user.

In the enrolment phase and/or in the verification phase, the step of determining at least one transfer function for bone conduction of an audio signal through a person's head may comprise,
while the person is wearing an earpiece, wherein the earpiece comprises a first transducer located on an outward facing part of the earpiece and a second transducer located on a part of the earpiece facing into the person's ear canal, and
while the person is speaking:
generating a first transducer output signal from the first transducer;
generating a second transducer output signal from the second transducer; and
determining a transfer function based on a relationship between the first transducer output signal and the second transducer output signal.

The first transducer may comprise a microphone.

The second transducer may comprise a microphone or an accelerometer.

The method may comprise:
while the person is wearing the earpiece, and
while the person is speaking:
determining a plurality of times when the speech contains a specific acoustic class;
generating the first transducer output signal from the first microphone;
generating the second transducer output signal from the second microphone;
determining a transfer function for said specific acoustic class based on the relationship between the first transducer output signal and the second transducer output signal at said plurality of times.

The specific acoustic class may comprise voiced speech.

The method may comprise:
while the person is wearing the earpiece, and
while the person is speaking:
determining respective pluralities of times when the speech contains a plurality of specific acoustic classes;
generating the first transducer output signal from the first microphone;
generating the second transducer output signal from the second microphone;
determining a respective transfer function for each of said specific acoustic classes based on the relationship between the first transducer output signal and the second transducer output signal at said respective pluralities of times.

The specific acoustic classes may comprise specific voiced phonemes.

The method may comprise:
determining the or each transfer function by means of an adaptive filter adapted using a Least Mean Squares method.

The method may comprise determining the or each transfer function by determining the transfer function that would be required to transform the first transducer output signal into the second transducer output signal, or vice versa.

The method may comprise, in the enrolment phase and/or in the verification phase:
determining whether the first transducer output signal and/or the second transducer output signal meets at least one quality criterion; and
determining the or each transfer function based on the relationship between the first transducer output signal and the second transducer output signal only if the at least one quality criterion is met.

The at least one quality criterion may comprise a signal-to-noise ratio of the respective transducer output signal.

The at least one quality criterion may comprise a number of useful samples in the respective transducer output signal.

The method may further comprise, after the enrolment phase:
  while a person is speaking, determining that the person speaking is the enrolled user;
  determining at least one enrolment transfer function for bone conduction of an audio signal through the head of the person speaking; and
  storing a new enrolment transfer function for the enrolled user.

According to a further aspect of the present invention, there is provided a system configured for performing a method according to the first aspect.

According to a further aspect of the present invention, there is provided a system comprising a processor, wherein the processor is configured for performing a method according to the first aspect.

According to a further aspect of the present invention, there is provided a computer program product, comprising a tangible and/or non-volatile computer readable medium, comprising computer readable instructions for causing a processor to perform a method according to the first aspect.

According to a second aspect of the present invention, there is provided a method of identifying a person, the method comprising:
  while the person is wearing an earpiece, wherein the earpiece comprises a first microphone located on an outward facing part of the earpiece and a second microphone located on a part of the earpiece facing into the person's ear canal, and
  while the person is speaking:
  generating a first acoustic signal from the first microphone;
  generating a second acoustic signal from the second microphone;
  determining at least one transfer function based on a relationship between the first acoustic signal and the second acoustic signal; and
  using said at least one transfer function as a biometric identifier.

The method may comprise:
  while the person is wearing the earpiece, and
  while the person is speaking:
  determining a plurality of times when the speech contains a specific acoustic class;
  generating the first acoustic signal from the first microphone;
  generating the second acoustic signal from the second microphone;
  determining a transfer function for said specific acoustic class based on the relationship between the first acoustic signal and the second acoustic signal at said plurality of times.

The specific acoustic class may comprise voiced speech.

The method may comprise:
  while the person is wearing the earpiece, and
  while the person is speaking:
  determining respective pluralities of times when the speech contains a plurality of specific acoustic classes;
  generating the first acoustic signal from the first microphone;
  generating the second acoustic signal from the second microphone; and
  determining a respective transfer function for each of said specific acoustic classes based on the relationship between the first acoustic signal and the second acoustic signal at said respective pluralities of times.

The specific acoustic classes may comprise specific voiced phonemes.

The method may comprise:
  determining the or each transfer function by means of an adaptive filter adapted using a Least Mean Squares method.

The method may comprise determining the or each transfer function by determining the transfer function that would be required to transform the first acoustic signal into the second acoustic signal, or vice versa.

According to a further aspect of the present invention, there is provided a system configured for performing a method according to the second aspect.

According to a further aspect of the present invention, there is provided a system comprising a processor, wherein the processor is configured for performing a method according to the second aspect.

According to a further aspect of the present invention, there is provided a computer program product, comprising a tangible and/or non-volatile computer readable medium, comprising computer readable instructions for causing a processor to perform a method according to the second aspect.

In some embodiments, this has the advantage that it provides an additional method for verifying a person's identity in a non-invasive and non-obtrusive way.

According to a further aspect of the disclosure, there is provided a method of detecting whether a device is being worn by a user, wherein the device comprises a first transducer and a second transducer, the method comprising:
  determining at least one verification transfer function based on a relationship between a first signal derived from the first transducer and a second signal derived from the second transducer; and determining whether the at least one verification transfer function is representative of a bone conduction path of an audio signal through the user's head; and
  determining that the device is being worn if it is determined that the at least one verification transfer function is representative of the bone conduction path of the audio signal through the user's head.

The first transducer may comprise a microphone. The second transducer may comprise a microphone or an accelerometer.

In some embodiments, determining whether the at least one verification transfer function is representative of a bone conduction path of an audio signal through the user's head may comprise comparing the at least one verification transfer function with at least one template transfer function representative of the bone conduction path of the audio signal through the user's head.

In some embodiments, determining whether the at least one verification transfer function is representative of a bone conduction path of an audio signal through the user's head may comprise providing the at least one verification transfer function to a neural network trained using training data comprising one or more transfer functions representative of a bone conduction path of an audio signal through a human head.

The method may comprise determining that the first signal or the second signal comprises speech. The at least one verification transfer function may be determined when the first signal or the second signal comprises speech.

In some embodiments, the method may comprise determining that the speech contains a specific acoustic class, wherein the at least one verification transfer function is determined when the speech contains the specific acoustic class. The specific acoustic class may be voiced speech.

The at least one verification transfer function may comprise an average transfer function for the first and second signal over a first time period.

In some embodiments, the method comprises determining the at least one verification transfer function by means of an adaptive filter adapted using a Least Mean Squares method.

In some embodiments, the method comprises determining the at least one verification transfer function by determining a transfer function that would be required to transform the first signal into the second signal, or vice versa.

The first transducer may be configured, in use, to face outwards relative to the user's head.

According to a further aspect of the disclosure, there is provided a system configured for performing the method described above.

According to a further aspect of the disclosure, there is provided a system comprising a processor, wherein the processor is configured for performing a method as described above.

According to a further aspect of the disclosure, there is provided a computer program product, comprising a tangible and/or non-volatile computer readable medium, comprising computer readable instructions for causing a processor to perform a method as described above.

BRIEF DESCRIPTION OF DRAWINGS

For a better understanding of the invention, and to show how it may be put into effect, reference will now be made, by way of example, to the accompanying drawings, in which.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Bone conduction headphones are known, in which sound is generated through speaker pads that rest on the user's skull or jaw, so that the sound is transmitted through the user's bones to their ear.

Embodiments of the invention, as described in more detail below, proceed from the realisation that the sound conduction path, through a person's head, is characteristic of that person. This is because the sound conduction path, and in particular the transfer function of the sound conduction path, depends on such factors as the person's bone density and the structure of their skull.

The methods described herein may be implemented in a wide range of devices and systems. However, for ease of explanation of one embodiment, an illustrative example will be described, in which the implementation occurs in a host device, which is used with a wearable accessory. A further illustrative example will then be described, in which the implementation occurs in a wearable device.

Figure 1:
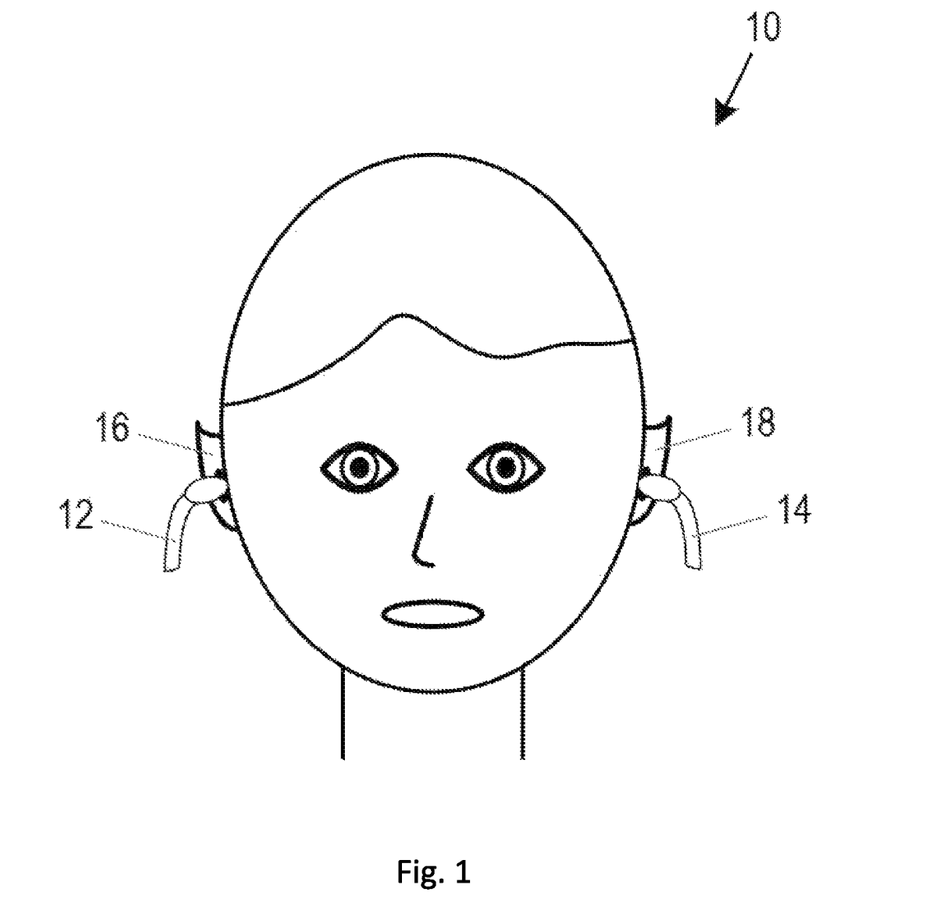
FIG. 1 illustrates a person wearing an earphone.

FIG. 1 illustrates a person wearing an earphone.

Specifically, FIG. 1 shows a person 10, wearing one wireless earbud 12, 14 in each ear 16, 18. Although this shows a person wearing two earbuds, the method is applicable when only one earbud is being worn.

In addition, although FIG. 1 shows a person wearing wireless earbuds, the method is applicable to any wearable device that can be used with a host devices, such as wired or wireless earbuds or earphones, for example in-ear earphones, supra-aural earphones, or supra-concha earphones. Other examples include smart glasses, augmented reality (AR) glasses, AR headsets, or virtual reality (VR) glasses or headsets.

Figure 2:
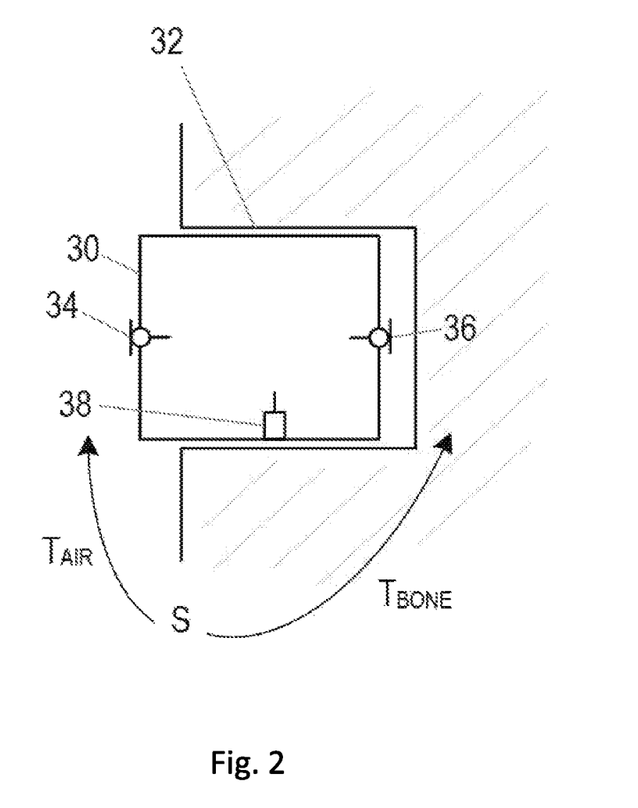
FIG. 2 illustrates an earphone in a person's ear.

FIG. 2 illustrates an earphone in a person's ear.

Specifically, FIG. 2 shows an earbud 30 at the entrance to a wearer's ear canal 32.

In general terms, the earphone comprises a first transducer and a second transducer. While a person is wearing the earphone, a first transducer is located on an outward facing part of the earphone and a second transducer is located on a part of the earphone facing into the person's ear canal.

In the embodiment shown in FIG. 2, the first transducer comprises a microphone 34, located such that it can detect ambient sound in the vicinity of the earbud 30.

In the embodiment shown in FIG. 2, the earbud 30 also comprises a second microphone 36, located such that it can detect sound in the wearer's ear canal 32. The earbud 30 also comprises an accelerometer 38, located on the earbud 30 such that it can detect vibrations in the surface of the wearer's ear canal 32 resulting from the transmission of sound through the wearer's head. The second transducer, mentioned above, can be the second microphone 36, or can be the accelerometer 38.

In particular, embodiments described herein obtain information about the sound conduction path, through the wearer's head, by comparing the signals detected by the first transducer and the second transducer. More specifically, embodiments described herein obtain information about the sound conduction path, through the wearer's head, by comparing the signals detected by the first transducer and the second transducer at times when the wearer is speaking.

Thus, as shown in FIG. 2, when the wearer is speaking and generating a sound S, this is modified by a first transfer function $T_{AIR}$ through the air before it is detected by the external microphone 34, and it is modified by a second transfer function $T_{BONE}$ through the bone and soft tissue of the wearer's head before it is detected by the second transducer 36 or 38.

The processing of the signals generated by the external microphone 34, and by the one or more internal transducer 36, 38, may be performed in circuitry provided within the earbud 30 itself. Alternatively, the signals generated by the external microphone 34 and by the one or more internal transducer 36, 38 may be transmitted by a suitable wired or wireless connection to a host device such as a smartphone or a smart wearable device, where the processing of the signals, as described in more detail below, takes place.

Figure 3:
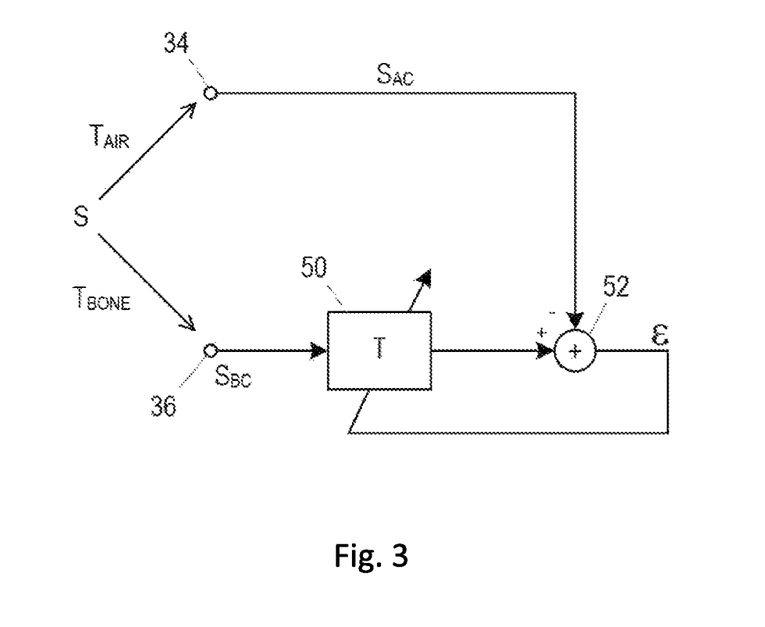
FIG. 3 illustrates a principle of operation of a method in accordance with aspects of the disclosure.

FIG. 3 illustrates a principle of operation of a method in accordance with aspects of the disclosure.

Thus, as described with reference to FIG. 2, the sound S is modified by the first transfer function $T_{AIR}$ through the air before it is detected by the external microphone 34, which generates a signal $S_{AC}$. In addition, the sound S is modified by the second transfer function $T_{BONE}$ through the wearer's head before it is detected by the internal microphone 36, which generates a signal $S_{BC}$. The same principle applies if the second transducer takes the form of an accelerometer 38.

In some embodiments, we are primarily interested in the situation where the sound S is the sound of the wearer's speech. As such, the signals generated by the external microphone 34 and/or the internal microphone 36 may be applied to a voice activity detection block, so that the signals $S_{AC}$ and $S_{BC}$ are only considered during times when the wearer is speaking. In other embodiments described in more detail below, it may be advantageous to consider sound when the wearer is not speaking. In such cases, the voice activity detection block may be used to discern between speech and non-speech states. The voice activity detection block may also be configured in some embodiments to discern between voiced and unvoiced speech of the wearer.

It is not trivial to compare the signals $S_{AC}$ and $S_{BC}$, because the signal $S_{AC}$ is strongly affected by external noise, while $T_{BONE}$ is strongly non-linear and band limited. In fact, the bone conduction path may have an effective gain relative to the air conduction path at low frequencies, but it reduces quickly at higher frequencies.

FIG. 3 shows a system identification method being used to determine the transfer function $T_{BONE}$ of the bone conducted speech.

As mentioned above, the signal $S_{AC}$ results from the application of the first transfer function $T_{AIR}$ to the sound S, while the signal $S_{BC}$ results from the application of the second transfer function $T_{BONE}$ to the sound S.

Thus, $S_{AC} = S \cdot T_{AIR}$ and $S_{BC} = S \cdot T_{BONE}$, and so:

$$S = S_{AC}/T_{AIR} = S_{BC}/T_{BONE}$$

Therefore:

$$S_{AC} = T \cdot S_{BC}, \text{ where:}$$

$$T = T_{AIR}/T_{BONE}.$$

FIG. 3 shows the signal $S_{BC}$ being applied to a block 50 with an adaptive transfer function. The signal $S_{AC}$ is then subtracted from the output of the block 50 in a subtractor 52. The output of the subtractor 52 is an error term ε, which is used to adapt the transfer function of the block 50, in such a way as to minimise ε. The adaptation of the transfer function should take place slowly enough that the effect of noise on the signal $S_{AC}$ is averaged out, and hence the transfer function of the block 50 becomes equal to the transfer function that needs to be applied to the signal $S_{BC}$, to make it equal to the signal $S_{AC}$, i.e. the transfer function T in the equation above.

The system identification therefore performs a Least Mean Squares (LMS) method of adaptation.

Thus, using the system identification method shown in FIG. 3 does not strictly determine the transfer function $T_{BONE}$ of the bone conducted speech, but it does determine the relationship between $T_{BONE}$ and the transfer function $T_{AIR}$ of the air conducted speech. TAR is for example a function of the properties of the microphone 34 and its acoustic porting in the earphone 30. If information about these is known in advance, it can be used to improve the estimate of $T_{BONE}$. Alternatively, the determined transfer function T can be taken as characteristic of that person while wearing that earphone, which may be useful in many situations, such as in making a determination as to whether the earphone (or other device) is being worn or not.

Figure 3A:
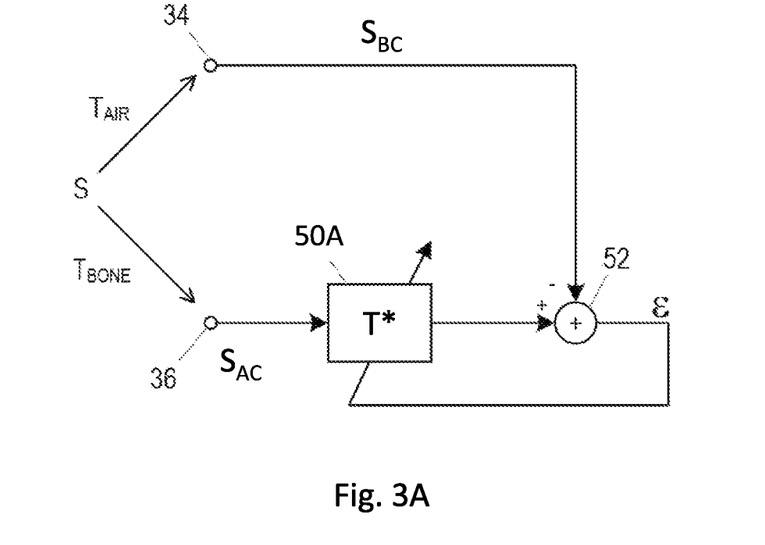
FIG. 3A illustrates a principle of operation of a method in accordance with aspects of the disclosure.

FIG. 3A shows a system identification method which is a variation of the that shown in FIG. 3 where like parts are given like numerals.

As mentioned above, the signal $S_{AC}$ results from the application of the first transfer function $T_{AIR}$ to the sound S, while the signal $S_{BC}$ results from the application of the second transfer function $T_{BONE}$ to the sound S.

Thus, $S_{AC} = S \cdot T_{AIR}$ and $S_{BC} = S \cdot T_{BONE}$, and so:

$$S = S_{AC}/T_{AIR} = S_{BC}/T_{BONE}$$

Therefore:

$$S_{BC} = T \cdot S_{AC}, \text{ where:}$$

$$T^* = T_{BONE}/T_{AIR}.$$

FIG. 3 shows the signal $S_{AC}$ being applied to a block 50A with an adaptive transfer function. The signal $S_{BC}$ is then subtracted from the output of the block 50 in the subtractor 52. The output of the subtractor 52 is an error term ε, which is used to adapt the transfer function of the block 50A, in such a way as to minimise ε. The adaptation of the transfer function should take place slowly enough that the effect of noise on the signal $S_{BC}$ is averaged out, and hence the transfer function of the block 50A becomes equal to the transfer function that needs to be applied to the signal $S_{AC}$, to make it equal to the signal $S_{BC}$, i.e. the transfer function T* in the equation above.

The alternative methods illustrated in FIGS. 3 and 3A can both be used for the purpose of biometric identification in addition to determining whether a user is wearing a device.

Figure 4:
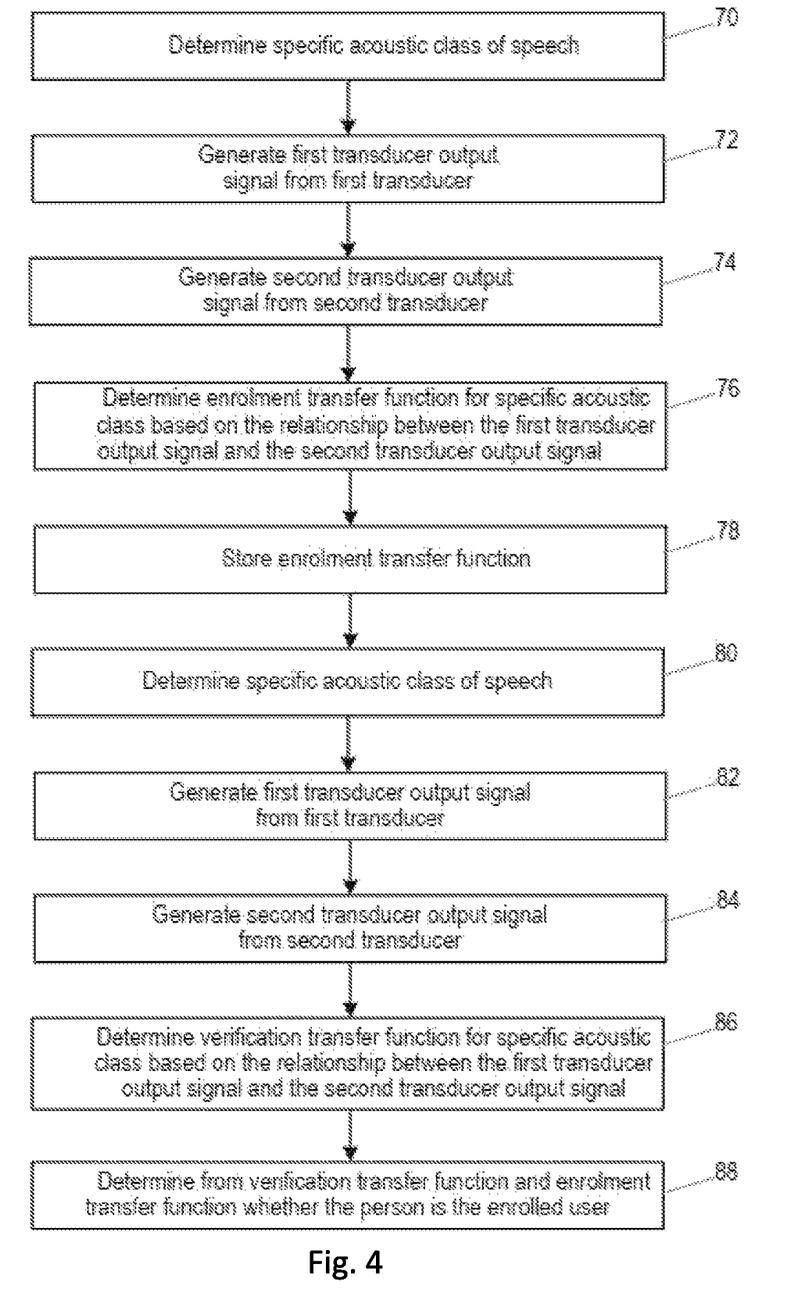
FIG. 4 is a flow chart, illustrating a method in accordance with aspects of the disclosure.

FIG. 4 is a flow chart, illustrating a method in accordance with aspects of the disclosure.

Specifically, FIG. 4 illustrates a method of biometric verification, where at least one person enrols with the system, and subsequently a person presents themselves as the enrolled user, and the system attempts to verify whether that person is the enrolled user.

The method of FIG. 4 makes use of one additional insight, namely that the bone conduction transfer function that applies to a person's speech, i.e. $T_{BONE}$ in the discussion above, depends on the position of the person's tongue while they are speaking. That is, the bone conduction transfer function depends for example on whether the person's tongue is in contact with their palate, or their teeth, or neither. The effect of this is that the bone conduction transfer function $T_{BONE}$ at any one specific time is a strong function of the phoneme being uttered at that time. For example, voiced speech has a much stronger transfer function than unvoiced speech.

The method of FIG. 4 is performed while an enrolling user is wearing an earphone as shown in FIG. 2, with a first transducer located on an outward facing part of the earphone and a second transducer located on a part of the earphone facing into the enrolling user's ear canal.

Then, while the person is speaking, at step 70 of the process shown in FIG. 4, times are identified when the speech contains a specific acoustic class. For example, since voiced speech has a much stronger transfer function than unvoiced speech, the system may identify times when the user's speech is voiced speech. In other examples, the system may identify times when the speech contains at least one more specific acoustic class.

During such times, at step 72, a first transducer output signal is generated from the first transducer, and at step 74 a second transducer output signal is generating from the second transducer.

At step 76, a transfer function is determined for the specific acoustic class, based on the relationship between the first transducer output signal and the second transducer output signal at the times when the speech contains the specific acoustic class.

Figure 5:
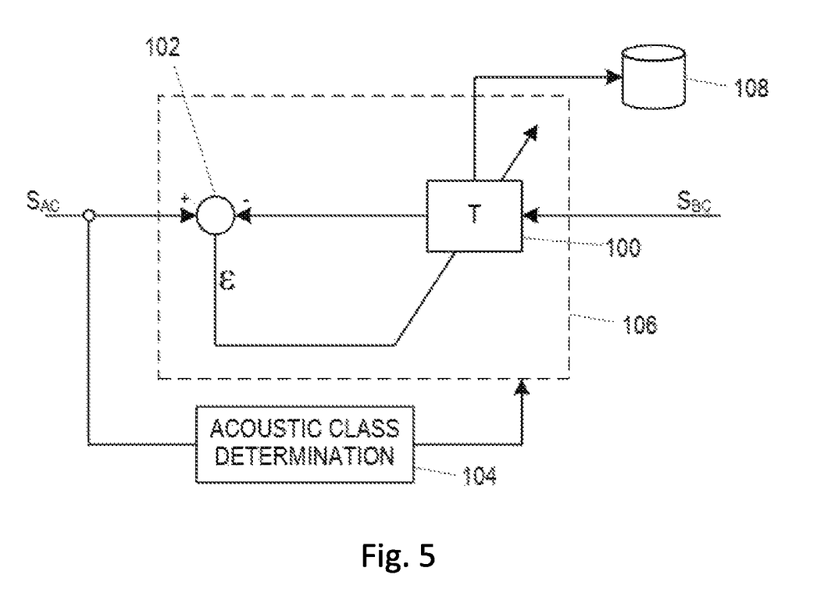
FIG. 5 illustrates a system for performing the method of FIG. 4, in one embodiment.

FIG. 5 shows a system illustrating this step in the method of FIG. 4, in one embodiment.

Specifically, FIG. 5 corresponds in general terms to FIG. 3, with the signal $S_{BC}$ being applied to a block 100 with an adaptive transfer function. It will be appreciated, however, that the system of FIG. 5 could in other embodiments be modified to correspond in general terms to FIG. 3A which, as noted above, is a variation of FIG. 3. The output of the block 100 is then subtracted from the signal $S_{AC}$ in a subtractor 102. The output of the subtractor 102 is an error term ε, which is used to adapt the transfer function of the block 100, in such a way as to minimise ε, so that the transfer function of the block 100 becomes equal to the transfer function that needs to be applied to the signal $S_{BC}$, to make it equal to the signal $S_{AC}$, i.e. the transfer function T in the equation above.

In this case, the signal $S_{AC}$ is also applied to an acoustic class determination block 104 that detects when the speech contains one or more specific acoustic class.

In one embodiment, the acoustic class determination block 104 detects when the speech contains voiced speech. In another embodiment, the acoustic class determination block 104 detects when the speech contains specific phonemes, for example vowel sounds and/or specific voiced consonants. As mentioned above, the transfer function T is a function of the uttered phoneme.

The acoustic class determination block 104 controls the adaptation block 106, such that the system only adapts in the presence of the specific acoustic class or classes. In some embodiments, where the acoustic class determination block 104 is configured to detect multiple acoustic classes, separate adaptations may be performed during respective periods when those acoustic classes are detected. In that way, the system can generate separate transfer functions for each of those acoustic classes.

Returning to FIG. 4, at step 78, the determined transfer function (or the determined transfer functions) obtained during the process of user enrolment is (or are) stored (in the database 108, in the example shown in FIG. 5). Where the system comprises a pair of earphones, this process may be performed for one or both of the earphones. This process may also be repeated for more than one user of the earphone.

When the one or more transfer function has been stored, the enrolment phase is complete.

Thereafter, a verification phase may be entered whenever it is desired to determine when a person wearing the earphone is the enrolled user, or one of the enrolled users. For example, when the earphone is connected to a device including a voice assistant, and the voice assistant determines that the speech represents a voice command, it may be desirable to verify that the person speaking is the enrolled user, before acting on that command.

The verification phase involves determining at least one verification transfer function for bone conduction of an audio signal through the head of a person wearing an earphone.

At step 80, while the person is speaking, times are identified when the speech contains a specific acoustic class. The specific acoustic class should correspond to some or all of the specific acoustic class or classes for which verification transfer functions were generated during the verification phase.

At step 82, during such times, a first transducer output signal is generated from the first transducer, and at step 84 a second transducer output signal is generated from the second transducer.

At step 86, a verification transfer function for the or each said specific acoustic class is generated, based on the relationship between the first transducer output signal and the second transducer output signal at said plurality of times.

The process of generating the or each verification transfer function may correspond to the process of generating the enrolment transfer function(s), as described with reference to FIG. 5.

At step 88 of the process of FIG. 4, it is then determined from the at least one verification transfer function and the at least one enrolment transfer function whether the person is the enrolled user.

For example, the determination in step 88 may be performed by extracting suitable features of the at least one verification transfer function and the at least one enrolment transfer function, and calculating the distance between vectors representing the features using some suitable measure (for example a Euclidean distance measure). This distance can then be compared with a threshold value, in order to determine whether the verification transfer function is sufficiently similar to the enrolment transfer function that it should be considered that the person is the enrolling user.

In other embodiments, a neural network may be trained using training data comprising pairs of transfer functions generated by the same person, and pairs of transfer functions generated by two different people, so that the trained neural network can determine whether the verification transfer function and the enrolment transfer function were or were not generated by the same person.

Additionally, in certain embodiments, it is tested whether the input signals fulfil one or more quality criteria, and they are only used in the disclosed method if they do fulfil the one or more quality criteria.

Figure 6:
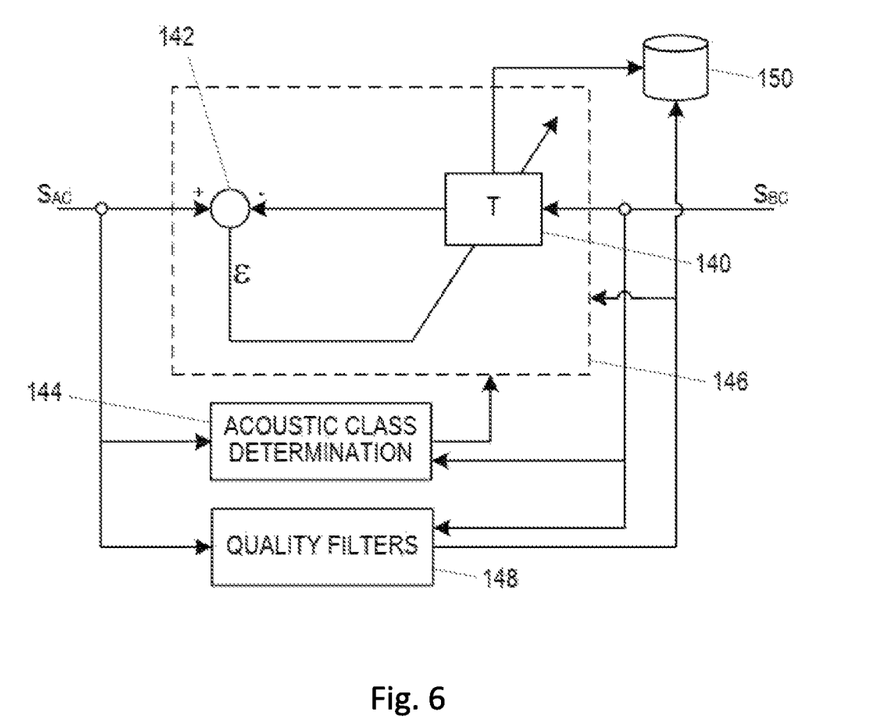
FIG. 6 illustrates a system for performing the method of FIG. 4, in another embodiment.

FIG. 6 shows a system illustrating this step in the method of FIG. 4, in one embodiment.

Specifically, FIG. 6 corresponds in general terms to FIG. 3, with the signal $S_{BC}$ being applied to a block 140 with an adaptive transfer function. The output of the block 140 is then subtracted from the signal $S_{AC}$ in a subtractor 142. The output of the subtractor 142 is an error term ε, which is used to adapt the transfer function of the block 140, in such a way as to minimise ε, so that the transfer function of the block 140 becomes equal to the transfer function that needs to be applied to the signal $S_{BC}$, to make it equal to the signal $S_{AC}$, i.e. the transfer function T in the equation above.

As in FIG. 5, the signal $S_{AC}$ is also applied to an acoustic class determination block 144 that detects when the speech contains one or more specific acoustic class.

As described in more detail with reference to FIG. 5, the acoustic class determination block 144 controls the adaptation block 146, such that the system only adapts in the presence of the specific acoustic class or classes. In some embodiments, where the acoustic class determination block 144 is configured to detect multiple acoustic classes, separate adaptations may be performed during respective periods when those acoustic classes are detected. In that way, the system can generate separate transfer functions for each of those acoustic classes.

The input signals $S_{AC}$ and $S_{BC}$ are also applied to one or more quality filters 148, which determine whether the input signals fulfil one or more quality criteria.

During the enrolment phase, quality metrics may be applied to confirm that the input signals $S_{AC}$ and $S_{BC}$ are of acceptable quality. For example it may be determined whether the Signal-Noise Ratio (SNR) of the signals is good enough to be confident that the results obtained from the method are reliable. Similarly, it may be determined whether the signals are such that enough samples have been obtained to be confident that the results obtained from the method are reliable.

When the system is configured to allow multiple transfer functions to be stored in the database 150, corresponding to respective different acoustic classes, a further quality metric may be applied to ensure that the input signals $S_{AC}$ and $S_{BC}$ represent speech containing the appropriate acoustic classes.

The output of the quality filters block 148 may operate such that, if the input signals do not meet the quality criteria, either the adaptation block 146 does not generate a transfer function T, or any transfer function that is generated is not stored in the database 150.

During the verification phase, quality metrics may be similarly applied by the quality filters block 148 to confirm that the input signals $S_{AC}$ and $S_{BC}$ are of acceptable quality. Again, for example, it may be determined whether the Signal-Noise Ratio (SNR) of the signals is good enough to be confident that the results obtained from the method are reliable. Similarly, it may be determined whether the signals are such that enough samples have been obtained to be confident that the results obtained from the method are reliable.

Figure 7:
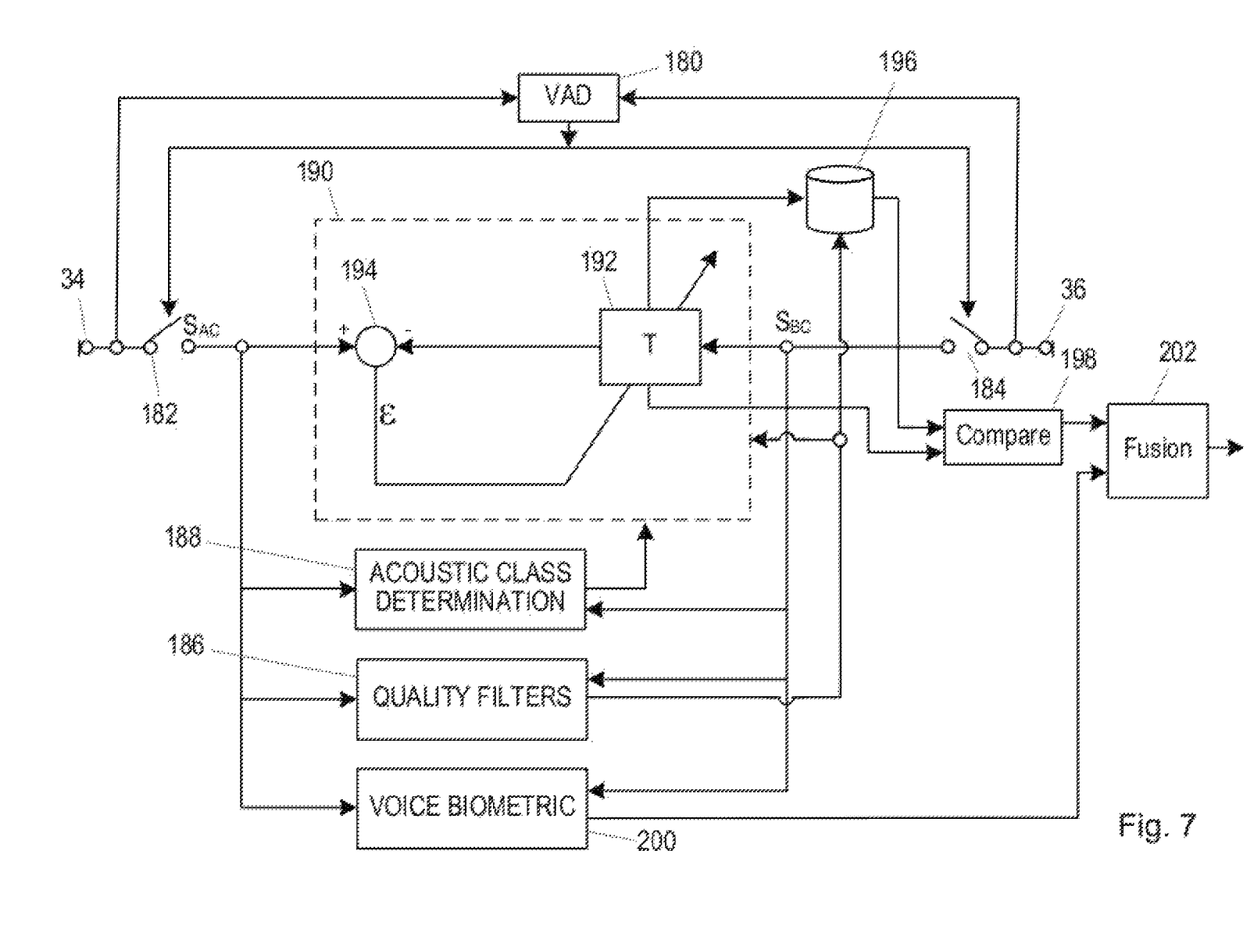
FIG. 7 illustrates a system for performing the method of FIG. 4, in another embodiment.

FIG. 7 shows a further system for performing the method of FIG. 4.

The device includes a first transducer in the form of an external microphone 34, and a second transducer which in this example takes the form of an internal microphone 36, as shown in FIG. 2.

The signals generated by the external microphone 34 and/or the internal microphone 36 are applied to a voice activity detection (VAD) block 180. During time periods when the voice activity detection block 180 determines that the microphone signals represent speech, respective switches 182, 184 connected to the external microphone 34 and the internal microphone 36 are closed, so that the respective signals $S_{AC}$ and $S_{BC}$ are passed for further processing.

During an initial enrolment, the signals $S_{AC}$ and $S_{BC}$ are passed to a quality filters block 186. This applies quality metrics to confirm that the input signals $S_{AC}$ and $S_{BC}$ are of acceptable quality. For example it may be determined whether the Signal-Noise Ratio (SNR) of the signals is good enough to be confident that the results obtained from the method are reliable. Similarly, it may be determined whether the signals are such that enough samples have been obtained to be confident that the results obtained from the method are reliable. When the system is configured to allow multiple transfer functions to be stored, corresponding to respective different acoustic classes, a further quality metric may be applied to ensure that the input signals $S_{AC}$ and $S_{BC}$ represent speech containing the appropriate acoustic classes.

If the input signals meet the quality criteria, the signals $S_{AC}$ and $S_{BC}$ are passed to an acoustic class determination block 188, which determines the acoustic class of the speech represented by the signals at that time.

If it is determined by the acoustic class determination block 188 that the signals represent an acoustic class for which a transfer function will be stored, the acoustic class determination block 188 enables operation of an adaptation block 190.

The adaptation block 190 operates such that the signal $S_{BC}$ is applied to a block 192 with an adaptive transfer function. The output of the block 192 is then subtracted from the signal $S_{AC}$ in a subtractor 194. The output of the subtractor 194 is an error term ε, which is used to adapt the transfer function of the block 192, in such a way as to minimise ε. The adaptation of the transfer function should take place slowly enough that the effect of noise on the signal $S_{AC}$ is averaged out, and hence the transfer function of the block 192 becomes equal to the transfer function that needs to be applied to the signal $S_{BC}$, to make it equal to the signal $S_{AC}$, i.e. the transfer function T discussed above.

The adaptation block 190 therefore performs a Least Mean Squares (LMS) method of adaptation to find the transfer function T. As described previously, the transfer function T can be taken as characteristic of that person while speaking that acoustic class, while wearing that earphone.

The control of the adaptation block 190 by the acoustic class determination block 188 enables a transfer function T to be calculated for one or more specific acoustic class, and in particular allows separate adaptations to be performed during respective periods when those different acoustic classes are detected, so that the system can generate separate transfer functions for each of those acoustic classes.

The or each transfer function is then stored in the database 196.

During the verification phase, while the VAD block 180 determines that the signal comprises speech, the same quality metrics may be applied by the quality filters block 186 to confirm that the input signals $S_{AC}$ and $S_{BC}$ are of acceptable quality. Again, for example, it may be determined whether the Signal-Noise Ratio (SNR) of the signals is good enough to be confident that the results obtained from the method are reliable. Similarly, it may be determined whether the signals are such that enough samples have been obtained to be confident that the results obtained from the method are reliable.

If the quality criteria are met, and while the input signal represents an acoustic class for which a stored enrolment transfer function exists, the adaptation block can be controlled such that a verification transfer function is generated for the each or each relevant acoustic class.

The or each verification transfer function that is generated is then passed to a comparison block 198, where it is compared with the corresponding enrolment transfer function for the same acoustic class retrieved from the database 196.

As discussed in more detail above with reference to step 88 in FIG. 4, the comparison may be performed by extracting suitable features of the at least one verification transfer function and the at least one enrolment transfer function, and calculating the distance between vectors representing the features using some suitable measure (for example a Euclidean distance measure). This distance can then be compared with a threshold value, in order to determine whether the verification transfer function is sufficiently similar to the enrolment transfer function that it should be considered that the person is the enrolling user.

Alternatively, the comparison may be performed by means of a suitably trained neural network comparing the verification transfer function and the enrolment transfer function to determine whether they were or were not generated by the same person.

In one further development, the system shown in FIG. 7 allows for updating of the stored enrolment transfer function or functions, after the initial enrolment.

For this purpose, the system includes voice biometric functionality 200. FIG. 7 shows the signals $S_{AC}$ and $S_{BC}$ both being supplied to the voice biometric block 200, but in practice it may be sufficient for only the air conducted signal $S_{AC}$ to be supplied to the voice biometric block 200.

When it is determined that the stored enrolment transfer function or functions should be updated, which may be under user control, or may be initiated periodically as a default, the voice biometric block 200 is activated. Provided that the voice biometric block 200 determines that the speech that is being detected at that time is the speech of the existing enrolled user, a new enrolment process can be performed, with one or more new enrolment transfer function being generated. The newly generated enrolment transfer function may be stored in addition to, or instead of, the existing enrolment transfer function, or alternatively a new enrolment transfer function may be created by combining the newly generated enrolment transfer function and the existing enrolment transfer function, for example by forming a weighted sum of the existing enrolment transfer function and the newly generated enrolment transfer function, with the weighting factor determining how fast the transfer function is updated.

Although the voice biometric process confirms that the newly generated enrolment transfer function is being generated while the speech of the existing enrolled user can be detected, there is a possibility that a spoof attack could be performed. That is, a recording of the speech of the existing enrolled user could be replayed, while the earphone is being worn by a different person. This would mean that the stored enrolment transfer function of the existing enrolled user would be replaced by an enrolment transfer function corresponding to that different person. To prevent this, the system can check for correlation between the signals $S_{AC}$ and $S_{BC}$ while speech of the given acoustic class is being received.

In a system that includes a voice biometric block 200, the voice biometric process can be operational whenever the bone conduction biometric process is being used to confirm that the earphone is being worn by the enrolled user.

The output of the voice biometric block 200 can then be fused with the output of the comparison block 198, in a fusion block 202, in order to produce a biometric output that has a higher confidence than either of the individual processes when considered separately.

There is thus described a system for using information about the properties of sound, conducted through the bone and soft tissue of a person's head, as a biometric identifier.

In the embodiments described above with reference to FIG. 4, a determination is made as to whether the person wearing the earphone is the enrolled user. The aspects described above are equally applicable to a scenario where there is a requirement to determine whether the user is wearing the earphone (or other device). It will be appreciated that the transfer function $T_{BONE}$ will vary depending on whether or not earphone (or other device) is worn by the user.

Figure 8:
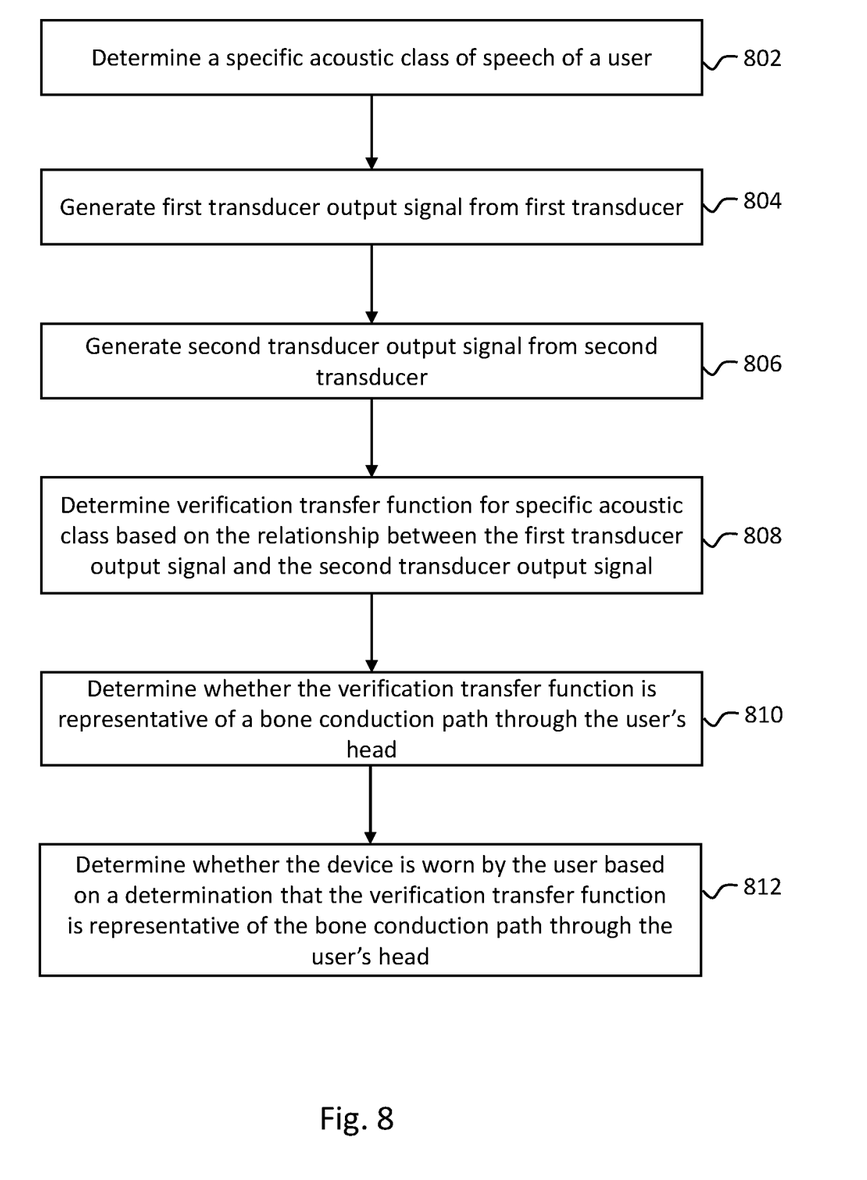
FIG. 8 is a flow chart illustrating a method in accordance with aspects of the disclosure.

FIG. 8 is a flow chart, illustrating a method in accordance with aspects of the disclosure.

Specifically, FIG. 8 illustrates a method of detecting whether a device is being worn, wherein the device comprises a first transducer 34 and a second transducer, such as the microphone 36 or the accelerometer 38.

The method here makes use of the insight that the bone conduction transfer function that applies to a person's speech, i.e. $T_{BONE}$ in the discussion above, depends on the location of the second transducer relative to the user's head.

The method of FIG. 8 may be performed while a user is wearing an earphone as shown in FIG. 2 or another wearable device comprising a first transducer located on an outward facing part of the earphone or device and a second transducer located on a part of the earphone or device. Where the second transducer is an accelerometer, the second transducer may be positioned anywhere in the earphone or device. Where the second transducer is a microphone (or speaker configured as a microphone), the second transducer preferably faces towards the user's head, for example towards the user's ear canal. The method of FIG. 8 may equally be performed while a user is not wearing the earphone or device, since an aim of the method described is to detect whether or not the earphone or device is being worn.

At step 802 of the process shown in FIG. 8, times are identified when the speech contains a specific acoustic class. For example, since voiced speech has a much stronger transfer function than unvoiced speech, the system may identify times when the user's speech is voiced speech. In other examples, the system may identify times when the speech contains at least one more specific acoustic class. In other examples, the system may identify merely when the signal received at the first or second transducer contains speech.

During such times, at step 804, a first transducer output signal is generated from the first transducer, and at step 806 a second transducer output signal is generating from the second transducer.

At step 808, a transfer function is determined for the specific acoustic class, based on the relationship between the first transducer output signal and the second transducer output signal at the times when the speech contains the specific acoustic class.

The transfer function may be determined in a similar manner to that described with reference to FIG. 5 and steps 76 and 86 of FIG. 4. In some embodiments, the transfer function may be measured over a time period or plurality of distinct time periods. For example, the transfer function may be an average transfer function measured over a time period or plurality of time periods. In some embodiments, the plurality time periods may coincide with speech or with a specific acoustic class of speech detected in the first or second transducer output signals.

Optionally, the determined transfer function (or the determined transfer functions) obtained is (or are) stored (in the database 108, in the example shown in FIG. 5). Where the system comprises a pair of earphones, this process may be performed for one or both of the earphones. This process may also be repeated for more than one user of the earphone.

Thereafter, a verification phase may be entered to determine whether a person is wearing the earphone (or other device).

Figure 9A:
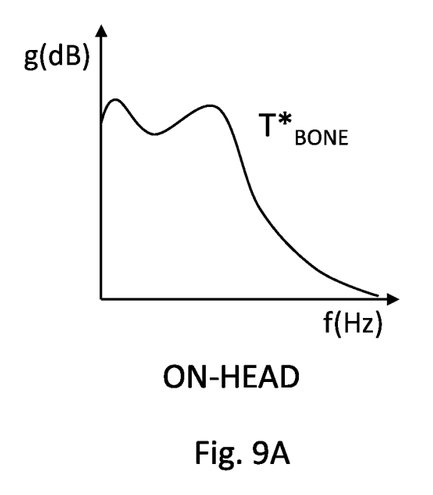
FIG. 9A is a graph showing a representative bone transfer function for a user.
Figure 9B:
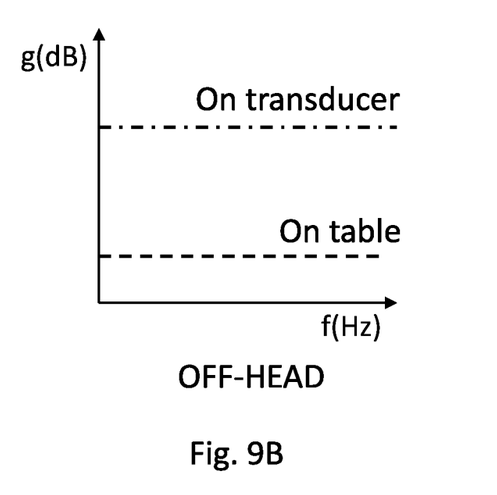
FIG. 9B is a graph showing a transfer function between two transducers of a wearable device when not being worn by the user.

At step 810 of the process of FIG. 4, it is then determined whether the verification function is representative of a bone conduction path through the user's head. FIG. 9A illustrates an example verification transfer function $T^*_{BONE}$ representative of the bone conduction path of a user. FIG. 9B illustrates an example verification transfer function with the earphone (or device) not worn by the user, specifically positioned either on a table or on a transducer (e.g. loudspeaker). In both cases, the verification transfer function is substantially flat since the internal and external transducers are receiving substantially the same sound.

In some embodiments, the determination in step 810 may be performed by extracting suitable features of the at least one verification transfer function and comparing these features with features of a template transfer function representative of the bone conduction path of the user. With the device positioned on the head of the user, it is likely that the verification transfer function would substantially match the template transfer function. For example, the determination in step 810 may comprise calculating the distance between vectors representing the features using some suitable measure (for example a Euclidean distance measure). This distance can then be compared with a threshold value, in order to determine whether the verification transfer function is sufficiently similar to the template transfer function that it should be considered that the user is wearing the earphone (or other device). The template transfer function may be specific to the user or may be an average or estimate based on a certain population.

In other embodiments, a neural network may be trained using training data comprising pairs of transfer functions generated by the same person when wearing the device, and pairs of transfer functions generated by the person wearing the device and not wearing the device, so that the trained neural network can determine whether the verification transfer function and the template transfer function were or were not both generated while the user was wearing the device.

At step 812 of the process in FIG. 4, if it is determined that the verification transfer function is representative of a bone conduction path through the user's head, then a determination is made that the earphone (or device) is being worn by the user. If it is determined that the verification transfer function is not representative of a bone conduction path through the user's head, then a determination is made that the earphone (or device) is not being worn by the user.

In embodiments described herein, the word "transducer" is used to collectively refer to any element configured to convert variations in a physical quantity. Examples of transducers include but are not limited to microphones, speakers configured as microphones (to detect sound pressure), accelerometers and an inertial measurement units (IMUs).

Embodiments may be implemented as an integrated circuit which in some examples could be a codec or similar. Embodiments may be implemented in a host device, especially a portable and/or battery powered host device such as a mobile computing device for example a laptop, notebook or tablet computer, a games console, a remote control device, a home automation controller or a domestic appliance including a domestic temperature or lighting control system, a toy, a machine such as a robot, an audio player, a video player, or a mobile telephone for example a smartphone. The device could be a wearable device such as a smartwatch. It will be understood that embodiments may be implemented as part of a system provided in a home appliance or in a vehicle or interactive display. The amplifier circuit may be an audio amplifier used to drive an audio transducer such as a loudspeaker or surface audio system, but it will be understood that the amplifier may be used to drive other transducers, e.g. a vibrational transducer such as a linear resonant actuator for the generation of haptic effects. There is further provided a host device incorporating the above-described system.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A method of biometric identification of a person comprising, during an enrolment phase:
   determining at least one enrolment transfer function for bone conduction of an audio signal through an enrolling user's head; and
   storing the at least one enrolment transfer function, and during a verification phase:
   determining at least one verification transfer function for bone conduction of an audio signal through the person's head; and
   determining from the at least one verification transfer function and the at least one enrolment transfer function whether the person is the enrolling user;
   wherein, in the enrolment phase and/or in the verification phase, the step of determining at least one enrolment transfer function or at least one verification transfer function for bone conduction of an audio signal through a person's head comprises, while the person is speaking and while the person is wearing an earpiece comprising a first transducer located on an outward facing part of the earpiece and a second transducer located on a part of the earpiece facing into the person's ear canal:
   determining a plurality of times when the speech contains a specific acoustic class;
   generating the first transducer output signal from the first microphone;
   generating the second transducer output signal from the second microphone; and
   determining the at least one enrolment transfer function or the at least one verification transfer function for said specific acoustic class based on the relationship between the first transducer output signal and the second transducer output signal at said plurality of times.

2. A method according to claim 1, wherein the specific acoustic class comprises voiced speech.

3. A method according to claim 1, comprising:
   while the person is wearing the earpiece, and
   while the person is speaking:
   determining respective pluralities of times when the speech contains a plurality of specific acoustic classes;
   generating the first transducer output signal from the first microphone;
   generating the second transducer output signal from the second microphone;
   determining a respective transfer function for each of said specific acoustic classes based on the relationship between the first transducer output signal and the second transducer output signal at said respective pluralities of times.

4. A method according to claim 3, wherein the specific acoustic classes comprise specific voiced phonemes.

5. A method according to claim 1, comprising:
   determining the at least one enrolment transfer function or the at least one verification transfer function by means of an adaptive filter adapted using a Least Mean Squares method.

6. A method according to claim 5, comprising determining the at least one enrolment transfer function or the at least one verification transfer function by determining a transfer function that would be required to transform the first transducer output signal into the second transducer output signal, or vice versa.

7. A method according to claim 1, comprising, in the enrolment phase and/or in the verification phase:
   determining whether the first transducer output signal and/or the second transducer output signal meets at least one quality criterion; and
   determining the at least one enrolment transfer function or the at least one verification transfer function based on the relationship between the first transducer output signal and the second transducer output signal only if the at least one quality criterion is met.

8. A method according to claim 7, wherein the at least one quality criterion comprises one or more of a signal-to-noise ratio of the respective transducer output signal; and a number of useful samples in the respective transducer output signal.

9. A method according to claim 1, further comprising, after the enrolment phase:
   while a person is speaking, determining that the person speaking is the enrolled user;
   determining at least one enrolment transfer function for bone conduction of an audio signal through the head of the person speaking; and
   storing a new enrolment transfer function for the enrolled user.

10. A system comprising a processor, wherein the processor is configured for performing a method according to claim 1.

11. A computer program product, comprising a tangible and/or non-volatile computer readable medium, comprising computer readable instructions for causing a processor to perform a method according to claim 1.

* * * * *